No. 640,565. Patented Jan. 2, 1900.
A. S. HUBBARD.
SYSTEM OF ELECTRICAL DISTRIBUTION.
(Application filed July 27, 1899.)
(No Model.)
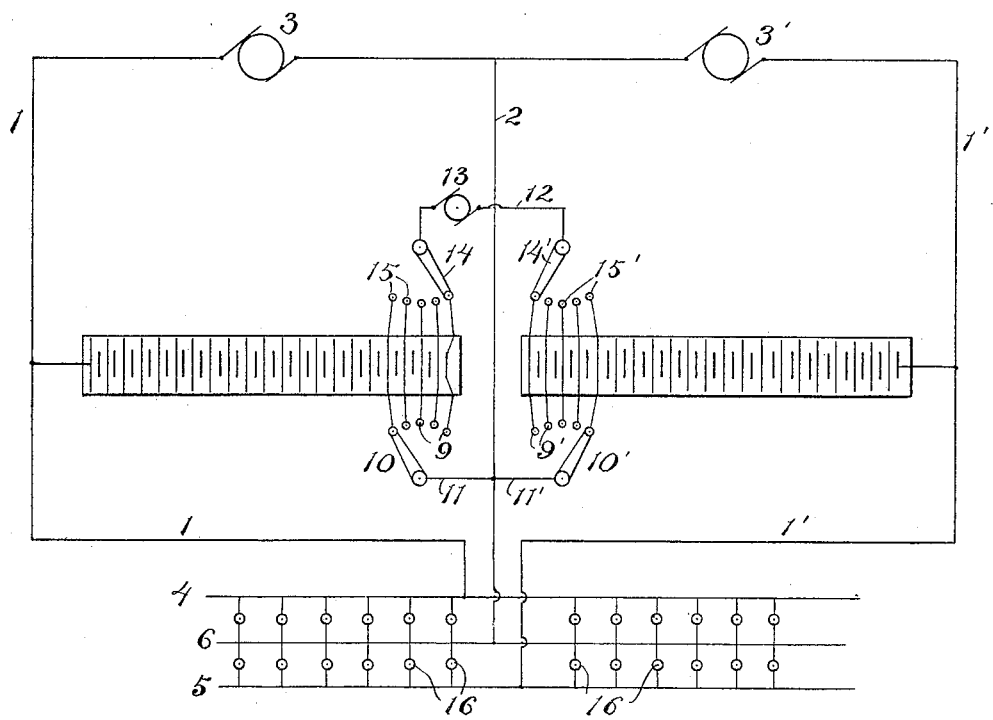
WITNESSES:
J. Green
Colin C. Campbell.
INVENTOR
Albert S. Hubbard
BY
ATTORNEYS

UNITED STATES PATENT OFFICE.

ALBERT S. HUBBARD, OF BELLEVILLE, NEW JERSEY, ASSIGNOR TO THE GOULD STORAGE BATTERY COMPANY, OF NEW YORK, N. Y.

SYSTEM OF ELECTRICAL DISTRIBUTION.

SPECIFICATION forming part of Letters Patent No. 640,565, dated January 2, 1900.

Application filed July 27, 1899. Serial No. 725,225. (No model.)

*To all whom it may concern:*

Be it known that I, ALBERT S. HUBBARD, a citizen of the United States, residing at Belleville, in the county of Essex and State of New Jersey, have invented certain new and useful Improvements in Systems of Electrical Distribution, of which the following is a specification.

This invention relates to improvements in systems of electrical distribution, and particularly to systems wherein storage batteries are used as load and voltage equalizers in connection with a booster which serves to compensate for the excess of charging voltage over discharge voltage.

My invention consists in a special arrangement of such a regulating system in connection with a three-wire circuit, whereby a single booster serves for both sides of the circuit.

Referring to the accompanying drawing, which is a diagram of a three-wire system embodying my invention, the two outer wires of the system are shown at 1 1' and the neutral or intermediate wire at 2. The dynamos 3 3' are included, respectively, between these outer wires and the neutral wire, and the three wires 1, 1', and 2 are shown as connected to the three wires 4 5 6 of a consumption-circuit, including lamps or other load devices 16. 6 6' represent two storage batteries respectively connected at their outer ends with the two main or outer wires 1 1' by wires 7 7' and provided at their other ends with regulating-cells, (indicated at 8 8'.) Connections are made from the respective regulating-cells to the respective contacts 9 9' of regulating-switches 10 10', whose contact-arms are connected to the neutral wire 2 by wires 11 11'. The respective regulating-cells are also connected to the successive contacts 15 15' of switches 14 14', whose contact-arms are connected together through a circuit 12, including a booster 13. It will therefore be noted that the booster 13 is not connected to the neutral wire, but is connected in a cross connection between the two sides of the circuit independent of the neutral wire. A single booster therefore can supply the requisite extra voltage on both sides or on either side of the circuit, the differences, if any exist, between the two sides of the circuit being compensated for by properly shifting switches 14 14'. On the other hand, the regulating-switches 10 10', connecting the regulating-cells adjustably to the neutral wire independently of the booster, enable the proper condition of electromotive force with regard to said wire to be maintained at all times.

I claim—

1. In a three-wire system of electrical distribution, the combination with the three-wire-supply circuit, of storage batteries connected to the outer wires of the circuit, regulating-cells on each side of the circuit connected to the respective storage batteries, a booster, a connection from said booster through the regulating-cells on each side of the circuit to the respective storage batteries, and a connection independent of the booster, from the respective storage batteries through the regulating-cells on each side of the circuit, to the intermediate wire of the system.

2. In a three-wire system of electrical distribution, the combination with the three-wire-supply circuit, of storage batteries connected to the outer wires of the circuit, regulating-cells on each side of the circuit connected to the respective storage batteries, a booster, a connection from said booster through the regulating-cells on each side of the circuit to the respective storage batteries, and a connection independent of the booster, from the respective storage batteries through the regulating-cells on each side of the circuit, to the intermediate wire of the system, and regulating-switches in the booster connection and in the connection to the intermediate wire, to adjust the number of regulating-cells included in circuit.

ALBERT S. HUBBARD.

Witnesses:
ARTHUR P. KNIGHT,
J. GREEN.